F. CONRAD.
MEANS FOR PROTECTING ELECTRICAL SYSTEMS.
APPLICATION FILED OCT. 31, 1910.
1,155,134. Patented Sept. 28, 1915.
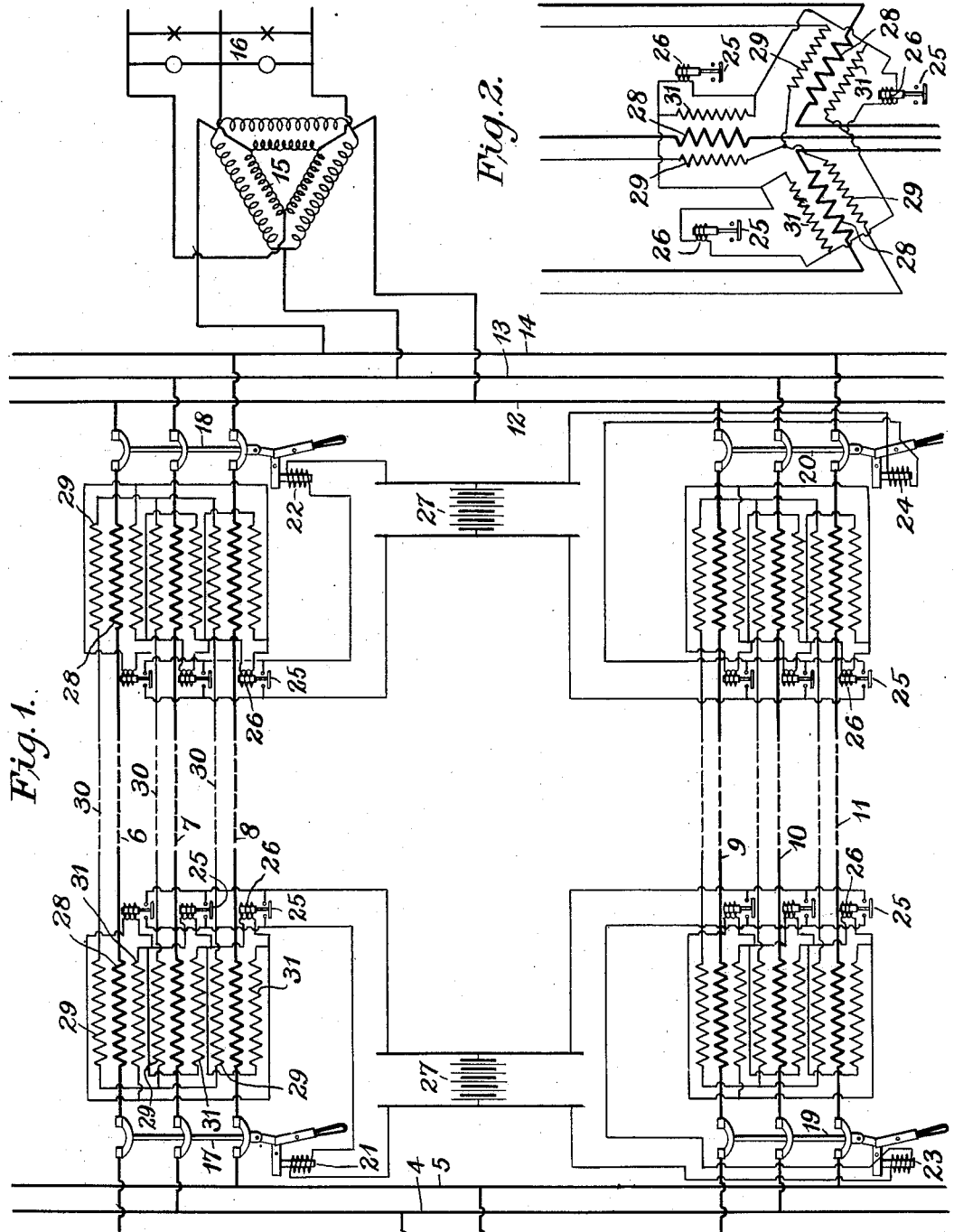
WITNESSES:
C. L. Belcher
Otto S. Schairer
INVENTOR
Frank Conrad
BY
Shirley G. Carr
ATTORNEY

UNITED STATES PATENT OFFICE.

FRANK CONRAD, OF SWISSVALE, PENNSYLVANIA, ASSIGNOR TO WESTINGHOUSE ELECTRIC AND MANUFACTURING COMPANY, A CORPORATION OF PENNSYLVANIA.

MEANS FOR PROTECTING ELECTRICAL SYSTEMS.

1,155,134.            Specification of Letters Patent.     Patented Sept. 28, 1915.

Application filed October 31, 1910. Serial No. 589,898.

*To all whom it may concern:*

Be it known that I, FRANK CONRAD, a citizen of the United States, and a resident of Swissvale, in the county of Allegheny and State of Pennsylvania, have invented a new and useful Improvement in Means for Protecting Electrical Systems, of which the following is a specification.

My invention relates to systems of electrical distribution, and particularly to protective means for systems comprising two or more parallel transmission circuits or lines extending between main stations and substations.

The object of my invention is to provide effective and reliable means for disconnecting an injured transmission circuit from a system, comprising two or more of such circuits, without disturbing the remaining circuit or circuits.

Figure 1 of the accompanying drawing diagrammatically illustrates a system embodying my invention, and Fig. 2 is an enlarged view showing the transformer connections at the ends of the system.

The system comprises a main station having a generator 1, a step-up transformer 2, and bus-bars 3, 4 and 5, which station is connected by means of two parallel transmission circuits 6—7—8 and 9—10—11, with a distant sub-station comprising bus-bars 12, 13 and 14, step-down transformer 15 and a distributing circuit 16. The invention, however, is adapted for use in connection with systems comprising any number of generating or sub-stations arranged in any other relation to each other than that shown, and also in connection with systems comprising any other number than two parallel transmission circuits or lines.

At the ends of the transmission circuits or lines, are circuit-breakers 17, 18, 19 and 20 having tripping coils 21, 22, 23 and 24, respectively, the circuits of which are governed by relay switches 25, one for each phase of the transmission circuits, the said switches having operating magnet windings 26 and the circuit-breaker tripping coils receiving current from batteries 27 or other suitable sources of energy.

At each end of each of the transmission circuits is a set of series transformers having primary windings 28 respectively connected in series with the conductors of the transmission circuits, and main secondary windings 29 connected in star relation in each group or set with their neutral points preferably grounded, the two sets associated with each transmission circuit being connected cumulatively by means of auxiliary conductors 30 extending parallel to the transmission circuit conductors. The series transformers are also provided with auxiliary secondary windings 31, which, in each group or set, are connected in a closed delta arrangement, the controlling or operating magnet windings 26 of the relay switches 25 being respectively connected in shunt to the said auxiliary secondary windings.

The series transformers and the resistances of the conductors 30 are so designed and proportioned with reference to each other that, under normal conditions, the currents in the main secondary windings of the transformers 29 are small as compared with their values under overload conditions. The currents in the auxiliary secondary windings 31 are also comparatively small, and the voltages applied to the relay coils 26 are not great enough to cause sufficient current to flow in the said coils to actuate the relays.

If the line current becomes excessive, however, the currents in both secondary windings of each transformer increase correspondingly, with the result that the voltages applied to the relay coils 26 become great enough to cause sufficient current to flow in them to operate the relays. The circuit breakers at both ends of an overloaded line are thus caused to operate and disconnect the line from the remainder of the system.

If the direction of flow of energy should reverse in a part of a line due to a ground or other injury, the currents in the two secondary windings 29 at opposite ends of the line will oppose each other, with the result that greater voltages are applied to the relay coils 26 by the auxiliary secondary windings 31, and the relays are operated to cause tripping of the circuit breakers. The use of the auxiliary secondary windings permits the apparatus to perform this function.

In case any fault or disturbance occurs upon the transmission circuit between the stations which would prevent some of the current, which leaves one station from reaching the next, and thus causes unequal amounts of current to flow through the primary windings 28 at both ends of the section, then the main relay current from the station carrying the greater load develops sufficient drop across the main secondary windings 29 of the corresponding series transformers at the other station to cause the voltage on the transformers at the overloaded station to operate the relays 25 and open the circuit breaker. Subsequent to this operation, a similar action at the other end of the section is effected and the section is thus segregated from the system.

It is obvious that if any of the main relay circuits 30 should become severed and thus open the circuit of the main secondary windings 29, the voltage on the auxiliary secondaries 31 would build up and the breakers at both ends of the section would be automatically tripped through the agency of the relays 25.

The series transformers are provided with auxiliary secondary windings in order that lightning and similar discharges or disturbances may not impress dangerous potentials upon the relays which are not directly in the distribution circuit and may be mounted on the switchboard or cause the operation of the circuit breakers. The use of the auxiliary secondary windings also prevents opening of the circuit-breakers when the relay conductors are traversed by continuous or direct currents which might result from charges derived from the air or from differences in the potential of the ground at the ends of the transmission circuit.

I claim as my invention:

1. A system of distribution comprising a transmission circuit, circuit-breakers therein at each end thereof, series transformers at the ends of the circuit having their primary windings respectively in series with the conductors of the transmission circuit, and their secondary windings respectively connected in series relation, the said transformers being provided with auxiliary secondary windings that supply current for governing the operation of the circuit-breakers.

2. A system of distribution comprising a transmission circuit, circuit-breakers therein at each end thereof, series transformers also at each end thereof and having their primary windings respectively in series with the conductors of the transmission circuit, and their secondary windings respectively connected in series relation, the said transformers being provided with auxiliary secondary windings that are connected in delta relation, and relays for governing the circuit-breakers respectively connected in shunt to the said auxiliary secondary windings.

3. A system of distribution comprising a transmission circuit, circuit-breakers therein at each end thereof, a set of series transformers also at each end of the transmission circuit having their primary windings respectively connected in series with the conductors of the said circuit, secondary windings for the transformers that are arranged in star relation in each set, conductors connecting the two sets of secondary windings, auxiliary secondary windings for the transformers that are connected in delta relation in each set, and relays for governing the circuit-breakers respectively connected in shunt to the said auxiliary secondary windings.

In testimony whereof, I have hereunto subscribed my name this 29th day of October 1910.

FRANK CONRAD.

Witnesses:
 OLIVER S. JENNINGS,
 B. B. HINES.